Patented Mar. 6, 1928.

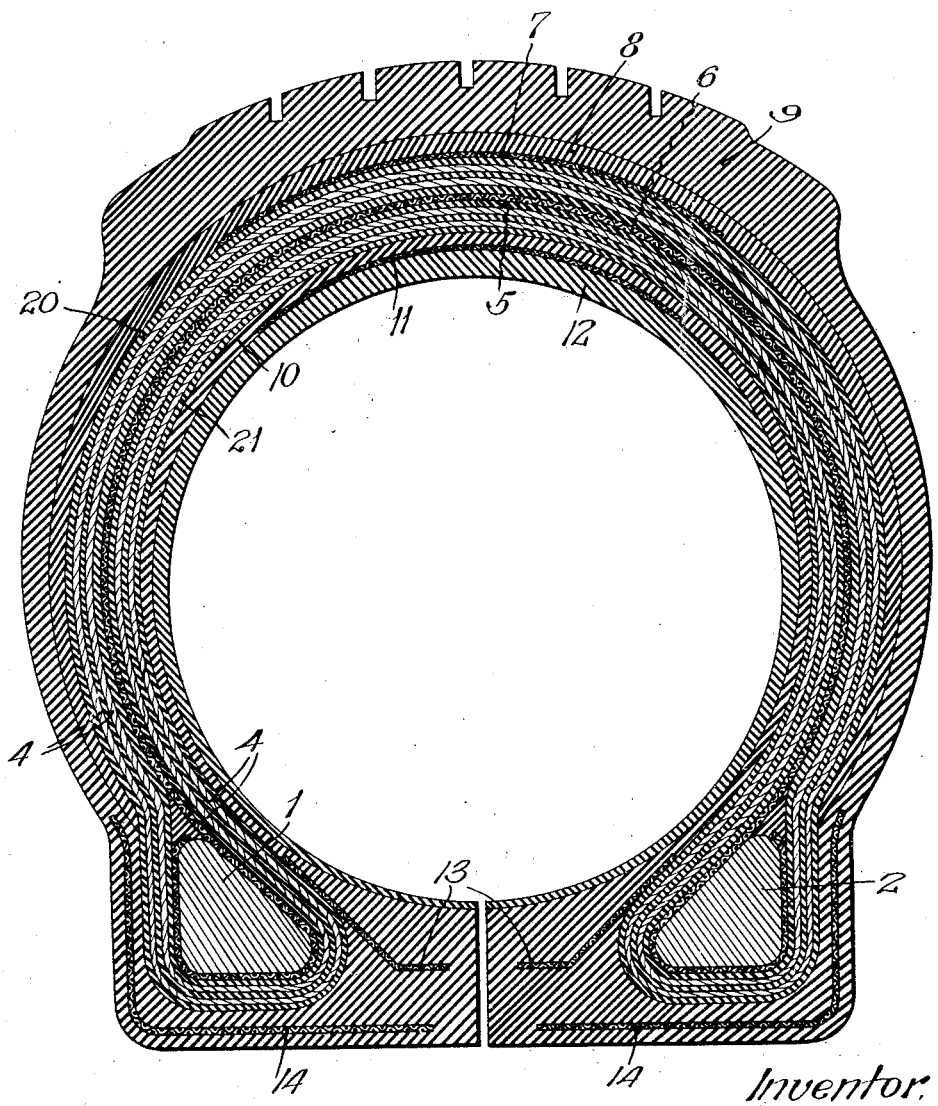

1,661,462

UNITED STATES PATENT OFFICE.

AMEL B. BROLUSKA, OF DETROIT, MICHIGAN

TIRE STRUCTURE.

Application filed October 11, 1924. Serial No. 743,119.

This invention has reference to tire structures and the object of the invention is to provide a cord tire of either the high pressure or low pressure balloon type in which the cords all run in the same direction continuously.

Another object of the invention is to provide a tire comprising cords extending at an angle to the plane of the tire and having a circumferential tension band so that the driving strain is taken off from the cords.

Another object of the invention is to provide a tire structure in which the cords are embedded in rubber and all run in the same direction to reduce the possibility of internal friction between the cords of the tire which occurs when the cords are interlaced in different directions.

Another object of the invention is to provide a tire which will not readily rim cut and which has a cushion support between the tube and the rim.

These objects and the several novel features of the invention are hereinafter more fully described and claimed and the preferred form of construction by which these objects are attained is shown in the accompanying drawing which is a cross section of a tire casing embodying my invention.

As shown in the drawing two annular base members 1 and 2 are provided about which the cords 4 are wound. The cords are wound around the member 1 and circumferentially around the tire form to the member 2 and thence back to the member 1 as will be understood from the drawing. In this way the cord casing may be built up into two, four, six, eight or more layers depending upon the thickness of wall desired. In this manner a single cord may be wound back and forth to form a double layer of cord structure of the casing and a layer of raw rubber is positioned in the space between the layers and over which the cords are wound. A layer of cushion gum is then put over the first double layer of wound cords and a new layer or cords is wound over the cushion gum. The new layer of cords is then covered with cushion gum and the next layer of cords is wound thereover. It will be noted that in each winding a double layer of cords is built up and thus the tire is built up in two, four, six, eight or more layers depending upon the strength of tire desired. When the first layer is started the rubber insert 5 is positioned as shown and carries a canvas or fabric circumferential tension band 6 to take the driving strain off from the cords and tends to strengthen the tire at the tread. The outer and inner surfaces of the cord carcass are then covered with cushion gum indicated by 20 and 21 shown in the drawing and a canvas or fabric circumferential tension band 7 is positioned on the periphery of the carcass thus formed and a layer of raw rubber 8 is positioned over the carcass before the tread 9 is mounted thereon. On the inner side of the tire a raw rubber portion 10 is provided and a canvas or fabric circumferential tension band 11 is provided within the portion 10 and the inside of the tire is lined with cushion gum 12. The rubber portions 10 and 12 form a cushion for the inner tube of the tire which fits in the circular space shown. The portion 10 is provided adjacent the rim on each side with a canvas insert 13 and a heavy canvas insert 14 is provided in the outer portion of the tire on the rim side. The portions 9 and 10 which are of raw rubber come together in the base and form a thick cushion as shown at the bottom of the drawing so that when the tube is inserted in the tire it is above the flanges of the rim and the tire will not easily rim cut and blow out. In this tire construction a perfectly round space is provided for the tube so that the inner tube of the tire is not forced out of shape. With the cords all running in the same direction the tire is made extremely flexible and the canvas tension bands absorb the driving strain and relieve the cords of strain to a great extent. In this construction in which the cords all run in the same direction a tire using as much as eight plies of cords may be used and will be as flexible or more flexible than a tire of the usual balloon type thus giving a greater cushion bed when riding.

Preferably the intermediate tension band 6 extends and is secured to the base members, the purpose of which is to strengthen the tire to prevent side deflection or "shimmying" as it is commonly called. In this manner a tire may be built up having the desired number of layers of cords and in which layers of rubber are provided between the cord layers as previously stated. The tension bands 7 and 11 on the exterior and interior of the cord layers respectively extend a short distance each side of the center plane of the tire providing a protection for the tread side as well as providing a tension member as described. The intermediate tension band 6 is preferably carried to the two base members as described and with this arrangement I secure a tire that is of great resistance to puncture on the tread side and is of maximum flexibility in the side walls.

The described arrangement of layers of cord and rubber and the tension members lying with the side edges in equidistantly disposed relation relative to the center plane of the tire produces a tire of the balloon type that, while fairly puncture resistant in the tread surface is highly flexible due particularly to the interposed layers of rubber. The side walls are comparatively thin, only one of the tension members being carried to the annular base members and thus, while of considerable strength, is much more flexible than the tread surface which is a desired characteristic in this type of tire. Furthermore, by extending the side walls beyond the annular base members to approximately the center plane of the tire a hollow interior of a truly circular form in cross section is provided for the support of an inner tube which, although not here shown, is to be placed within this casing. With this complete circular inner wall of the casing supporting the inner tube at all points there is less liability of injury to the inner tube upon a collapse of the tire for any reason as the tube does not extend to between the flanges of the casing as is the usual practice.

From the foregoing description it becomes evident that the device is very simple in construction and efficient in operation, is strong and flexible, will not readily rim cut or blow out and provides a device which accomplishes the objects described.

Having thus fully described my invention, its utility and mode of operation, what I claim and desire to secure by Letters Patent of the United States is—

A tire structure comprising a pair of annular base members, a series of layers of cords wound around the base members and shaped to form a carcass, said cord layers being embedded in rubber, a tension band extending about the tire circumferentially of the casing on the tread side between the layers of cords, a similarly positioned band on the exterior of the carcass, and a third similar tension band on the interior of the carcass, one of the said bands having its opposite edges secured to the base members, the cords and bands being separately embedded in rubber, a tread portion on the exterior of the casing, and a cushion rubber lining for the interior of the casing, the entire structure being vulcanized to secure the parts in the said relation.

In testimony whereof I sign this specification.

AMEL B. BROLUSKA.